United States Patent [19]
Streibl

[11] Patent Number: 5,756,914
[45] Date of Patent: May 26, 1998

[54] FITNESS FINGERBOARD FOR GUITARISTS

[76] Inventor: Markus Streibl, P.O. Box 210301, San Francisco, Calif. 94121

[21] Appl. No.: 528,934

[22] Filed: Sep. 15, 1995

[51] Int. Cl.$^6$ .................................................. G09B 15/06
[52] U.S. Cl. ............................................. 84/465; 84/293
[58] Field of Search .................. 84/465, 470 R, 84/293, 455, 314 R, 314 N; 272/67

[56] References Cited

U.S. PATENT DOCUMENTS

| | | | |
|---|---|---|---|
| 2,491,991 | 1/1949 | Lundback | 84/314 N |
| 2,816,469 | 12/1957 | Gossom | 84/314 R |
| 3,724,314 | 4/1973 | Columbo | 84/465 |
| 4,024,787 | 5/1977 | Larson | 84/465 |
| 4,065,995 | 1/1978 | Greer | 84/465 |
| 4,112,804 | 9/1978 | Cecchini | 84/465 |
| 4,132,143 | 1/1979 | Stone | 84/314 R |
| 4,765,608 | 8/1988 | Bonasera | 84/465 |
| 5,169,371 | 12/1992 | Holmes | 482/105 |

OTHER PUBLICATIONS

Wexler Catalog, Chicago Ill pp. 41 and 43 1967.

*Primary Examiner*—Cassandra C. Spyrou

[57] ABSTRACT

A finger exerciser is disclosed for use to train and strengthen the finger mechanics of a musician on a stringed musical instrument such as a guitar. The string tension is adjustable to provide a variation in tension for the fingers to displace the strings. The end saddles are also adjustable in height to vary the distance between the strings and the fretboard. A removable handle is used to facilitate holding the device thus providing an unobstructed finger manipulation of the strings. Various fret boards which are interchangeable on to the neck of the invention and include flat and scalloped fret boards. In addition, the invention with a scalloped fretboard which is continuous with the neck is also disclosed. The spacing of the flat fretboard is provided by removable frets on the fretboard, thus varying the spacing there between to simulate various sections of the neck of a stringed musical instrument such as a guitar.

8 Claims, 3 Drawing Sheets

FITNESS FINGERBOARD FOR GUITARISTS

BACKGROUND OF THE INVENTION

1. Field of the Invention

The invention disclosed herein relates to stringed musical instruments and more particularly, to a finger exerciser simulating a guitar neck thereby allowing the user to practice finger movements when it is not practical or possible to practice with the complete stringed instrument such as a guitar.

2. Overview of Prior Art

It has long been accepted that strengthening specific muscles is paramount to increased performance whether in athletic competition or task oriented activities. The skillful playing a musical instrument is a combination of talent, dedication and for certain instruments definitely a physical event. Stringed instruments, especially guitars, fall into this category. Right and left-handed players alike watch their fretting hand rather than their picking hand because it is by nature less secure and therefore more likely to make mistakes when performing a musical piece. To overcome this problem the fretting hand requires increased attention to play accurately in proper synchronization with the other hand. It follows then that a training tool that is especially designed to train the fretboard hand alone, independently and effectively enough in order to make up for the picking hand's natural advantage is highly desirable.

One such attempt was made by Greer in U.S. Pat. No. 4,065,995. In this a shortened neck, as in a guitar neck, is used with a single string wrapped in an offsetting circumpolar manner and tightly passing over a series of frets. The string tension is not intended to be adjustable but simply stay a fixed tension. In addition only a flat fret board with a fixed layout of frets is used and the relative positions of the frets are not movable to account for the different ranges or positions in simulating a real instrument. This limited workout space restricts the physical possibilities and therefore keeps the player from benefiting or practicing certain exercises. In addition, Greer's device is limited in structural strength since it is hollow. With no handle provided it is also difficult to hold while training. Lastly it features only one string gauge, unlike a real guitar neck. Different string gauges are not possible with Greer's design. All contribute to the fact that the disclosed device is not modern and effective enough for today's players and standards.

Bonasera, in U.S. Pat. No. 4,765,608 discloses a finger exerciser in which a wrist band supports a series of fingers, one each connected to one finger of the user. The fingers of the device are made of a resilient material in which the combination applies tension to the user's fingers thereby resisting their movement to the instrument. The device is cumbersome and awkward. Also the entire stringed instrument is necessary in order to use the device. These make it impractical to be used in the variety of ordinary daily situations. Furthermore the loop rings around the fingers make it difficult to execute sophisticated finger movements because of the string noise and the obstruction of the loop rings.

Holmes also disclosed a method of training musicians in U.S. Pat. No. 5,169,371. Holmes disclosed a hand weight which covers the user's palm and back of the hand. The fingers are not effected by the weight and therefore the idea of strengthening the finger muscles is not addressed. The weight applies minimal conditioning to the shoulder and upper arm muscles of the user which are not heavily taxed in the playing of the instrument as are the muscles used to flex the fingers.

In U.S. Pat. No. 3,724,314 to Columbo a finger training device is disclosed which includes a restraining bar which is adjustably mounted above the fingers as they move along the fingerboard of the instrument. This bar is positioned above the fingers of the user so as to limit the undo lifting of the fingers above the finger board of the instrument. Nothing is done to resist the flexion of the fingers or in any way exercise the finger muscles and a method of doing so is not obvious by utilizing the disclosed device. This is for beginners only and does not consider the trained and developed musician.

None of the encountered prior art gave proper attention to realistic hands-on training and proper muscular development. While some of the cited prior art limits itself in its workout scope other patents promote aimless purposes and are not result oriented enough. The portability of a reliable unit with adjustable string tension, variable spacing between the frets, flat and scalloped fret boards and a stable handle are highly desirable in order to achieve a fruitful training outcome for the user's fingers and mind. The combination of these qualities has not been adequately addressed by the disclosed devices.

SUMMARY OF THE INVENTION

The object of the disclosed invention is to provide a finger exerciser and training device for musicians which play stringed musical instruments such as guitars. The board is comprised of a neck similar to a section of a guitar neck, with a removable fret board. The fret board provides two separate designs one of a flat board with a multitude of grooves lying perpendicular to the long dimension of the neck. These grooves are received by a series of removable frets. These frets can be positioned in a variety of combinations thus providing varying spaces between the frets as they would appear on different positions on the neck of a stringed instrument thus enabling a variety of positions of the instrument to be simulated.

The other fret board is a scalloped board. In this the frets are only positioned at the apex of each scallop but a variety of spacing of the scallops can be manufactured so as to also simulate varying sections of the neck of the instrument. Since the fret board is removable from the neck, many different designs of fret boards can be used with the invention to accommodate virtually every musician's skill and type of stringed instrument.

The invention has one or more strings of equal or varied gauges which are secured at one end of the neck and traverse the upper side of the fret board to the second end and through a hollow center of the neck back to the first end to which the strings tie into a tensioning device located thereon. The tensioning device pulls on the strings to adjust the tension therein. The user holds the device with a handle, which is removably located on the second end of the invention and grasps the neck with either desired hand, right or left and manipulates the strings to deflect as would be done in typical application of playing the instrument. The tension in the strings can be adjusted to create greater or lesser resistance according to the strength and skill level of the user.

The invention is compact, simplistic, portable and can be used anytime and anywhere. It is operated strictly manually and doesn't make any sound. Therefore it can be used without disturbing others. The disclosed invention provides the musician, whether beginner or advanced, with the ability to practice at will and to determine his workout degree results in great joy, proficiency and security in skillful finger control regardless of musical style. No tuning or other accessories are necessary to make the device ready for training. The invention also aids the musician in memorizing and executing difficult passages or building finger speed. As a training tool, the invention will be a great help for group instruction. Namely for boosting sight reading skills. Since reading music requires the ability to instantly decode musical information on paper and transfer that information to one's musical instrument to be played fluently by the fret board hand, recognizing and visualizing the actual physicalities of any printed piece of sheet music must be drilled through repeated hands-on training. With the disclosed invention one can learn it rapidly, safely and conveniently. With these thoughts in mind the invention should be determined by the appended claims.

DETAILED DESCRIPTION OF THE PREFERRED EMBODIMENT

Figure 1:
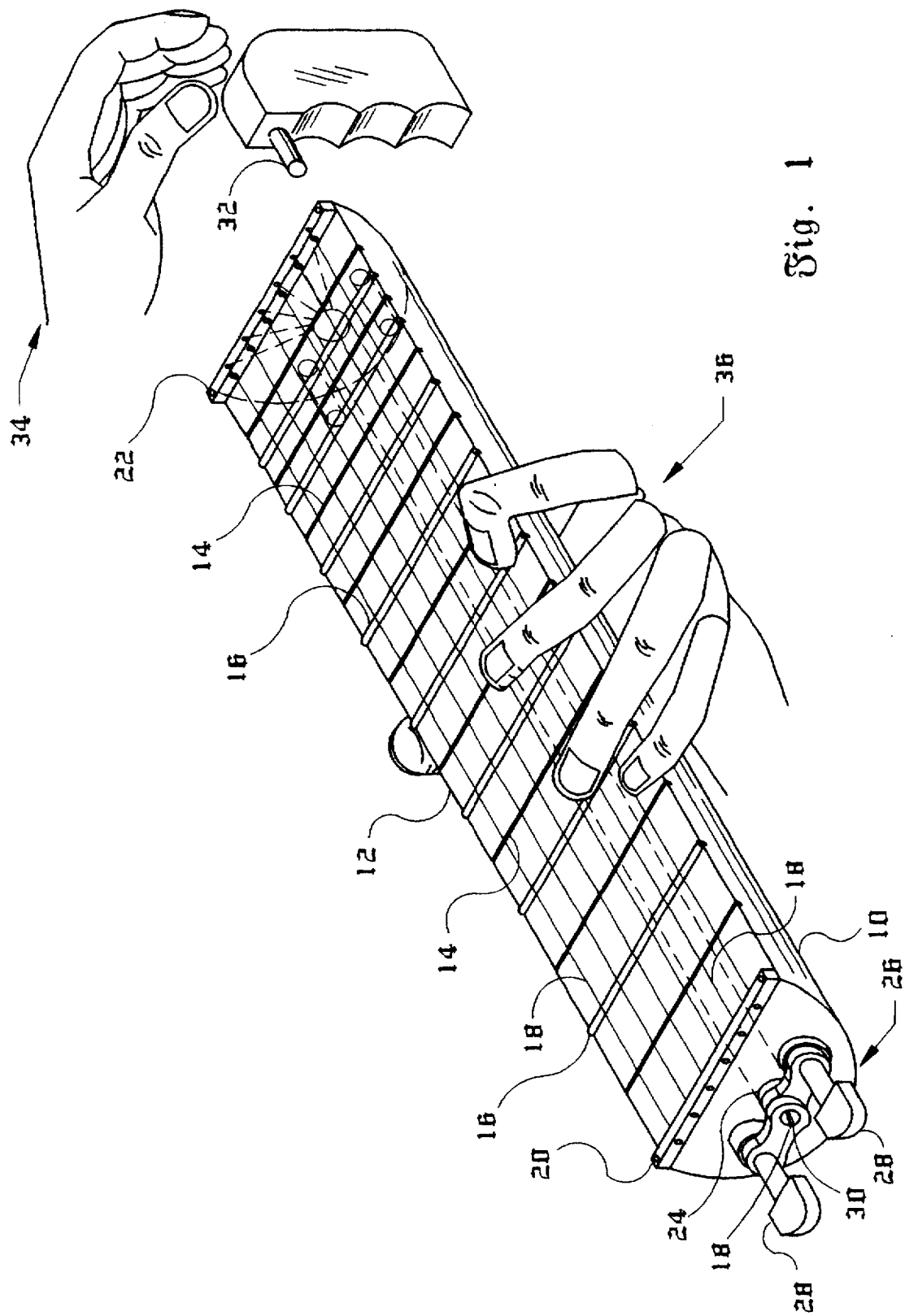
FIG. 1 is an isometric view of a fitness fingerboard with a flat fret board being used by a left handed player produced in accordance with the preferred embodiment of the present invention.

Referring to the drawings, a device constructed in accordance with the present invention is shown in FIG. 1, and comprises a neck 10 having the shape of an elongated half circle like a normal guitar neck to give the user an optimal and realistic workout feeling and best possible training results and measuring approximately 21 cm by 4.7 cm by 2 cm which is received by a fret board 12 in which a series of slots 14 are provided. Each of the slots 14 are capable of receiving a fret 16, the frets creating a raised edge above the surface of the fret board 12. The frets 16 can be positioned in any combination of the slots 14 thereby providing varied spacing between the frets 16 to simulate different locations on the neck of a stringed instrument such as a guitar.

A series of strings 18 of equal or varied gauges with respect to one another are provided which are secured at one end of the neck 10 by a first saddle 20 and extend along the length of the invention, over the upper edge of the frets 16 to a second saddle 22 located on the opposite end of the invention. The strings extend through this saddle 22 and through a center opening 24 (e.g. channel) which extends through the neck 10 back to just below the first saddle 20. This allows at least one tensioning device 26 (only one shown here) to be located thereon to provide adjustable tension to the strings 18. The ability to adjust the tension is important in any device that is involved with physical conditioning. The tensioning device 26 is a screw mechanism with a flat lip 28 for grasping and turning and a clamp device 30 to grasp and hold the ends of the strings 18. The purpose of providing the tensioning device 26 on first end of the invention is to allow for a handle 32 to be placed on the opposite end. This provides the user with the ability to hold the invention in an unobstructed manner in one hand 34 while training or exercising the other hand 36. A single tensioning device for all six strings is shown here, but an alternate desirable method would be to provide two tensioning mechanisms, similar to that shown, one for each of three strings, thereby providing varied or equal tension between strings.

Figure 2:
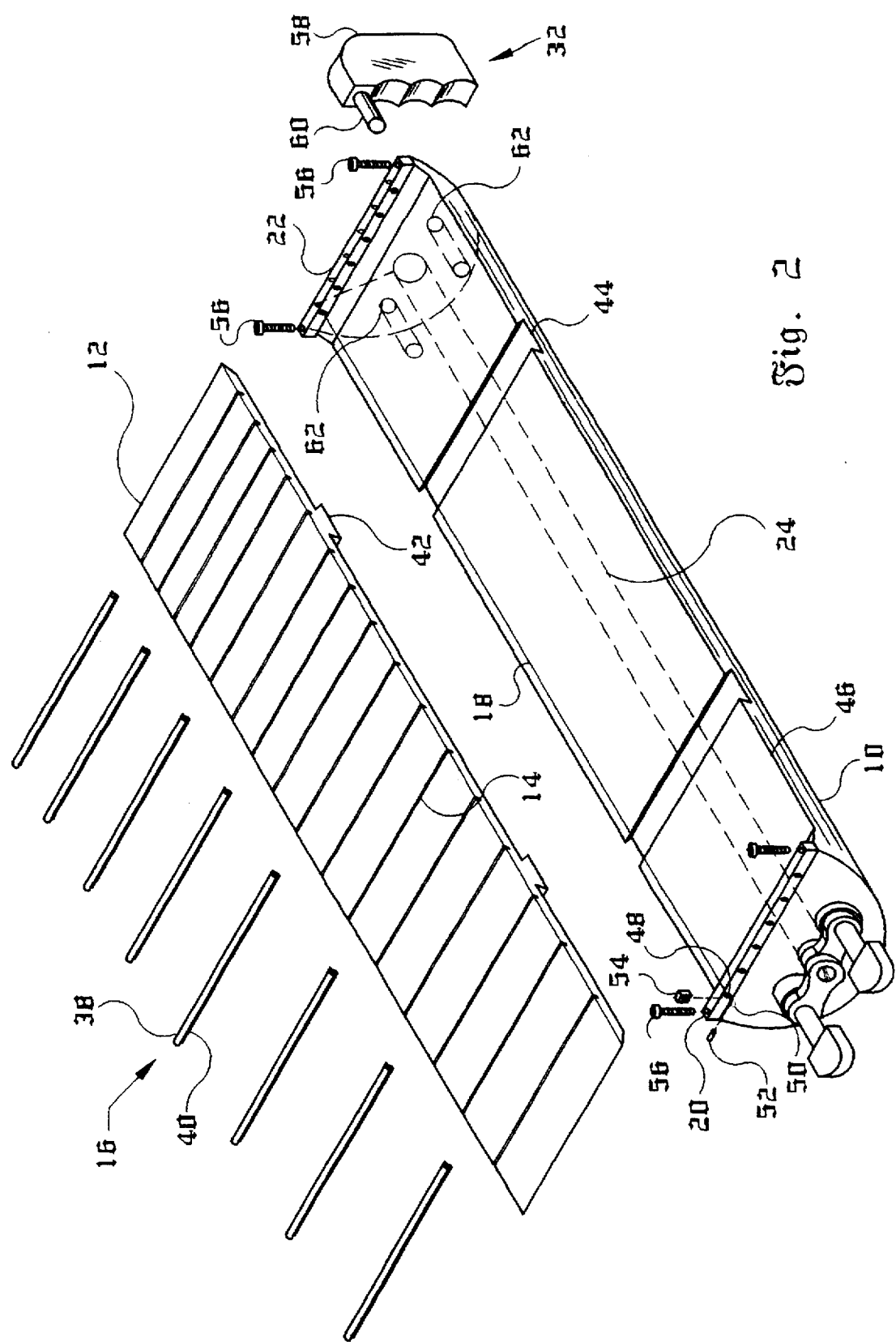
FIG. 2 is an exploded, isometric view of a fitness fingerboard with a removable flat fret board produced in accordance with the preferred embodiment of the present invention.

With reference to FIG. 2, the interaction of the components of the invention are shown in greater detail. The fret board 12 is shown with the provided slots 14 that are capable of receiving the removable frets 16. The frets have an upper surface 38 that is smooth and oversized in cross section as compared to the lip 40. The lip 40 fits into the slot 14 and the upper surface sits on top of the board 12 creating the raised edges of the fret board. The fret board 12 is also provided with a method of fastening to the neck 10. Here is shown a tong 42 located on the board 12, the tong being received by a grove 44 located on a flat surface 46 of the neck 10. This combination provides a location that is secure and removable. Other fastening means such as threaded fasteners could also be used here in place of the tong and grove method.

A string 18 is shown extending through a hole 48 in the first saddle 20. The end of the string 18 is provided a loop 50 in which a dowel 52 is inserted. A tension shim 54 is inserted between the dowel 52 and the outer surface of the saddle 20. This combination prevents the string from pulling through the hole 48, even under high string tension and to smooth out uneven string tension.

The second saddle 22 is shown to be secured to the neck 10 by a pair of threaded fasteners 56 as is the first saddle 20. By shimming the saddles 20 and 22 the height of the strings 18 above the fretboard 12 is easily adjustable. As before this type of fastening means is preferred but not paramount in the use of the invention. More complicated screw adjustment methods could be employed here but the added cost is not considered to be justified.

The handle 32 is comprised of a grip 58 and a rod 60. The rod is inserted in one or more holes 62 provided in the neck 10 below the second saddle 22. The optimal arrangement is found to be a pair of holes 62 one located on each side of the center opening 24. The handle is symmetrical about its center line and ratable because of the cylindrical rod 60, thus it can be easily used by either left and or right handed people.

Figure 3:
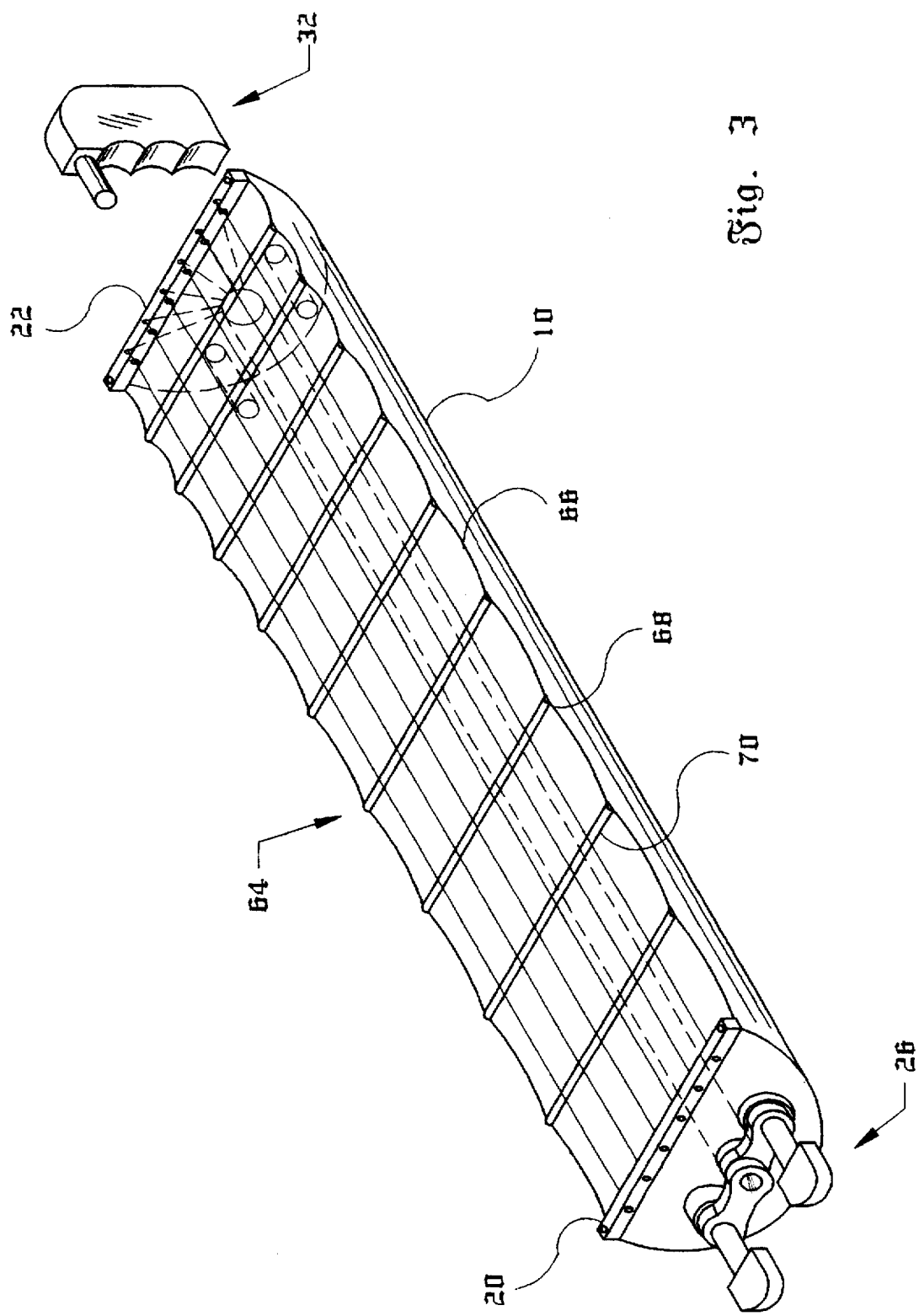
FIG. 3 is an isometric view of a fitness fingerboard with a scalloped fingerboard produced in accordance with the preferred embodiment of the present invention.

An alternative to the flat fret board includes a scalloped fret board that can be interchangeably used by a version of the invention. This arrangement is shown in FIG. 3. The neck 10, first saddle 20, the second saddle 22, tensioning device 26 and handle 32 are unchanged from that of the previously disclosed. The difference being the scalloped fret board 64 being provided with a series of scallops 66 or waves. The scalloped fret board 64 does not have separate groves and removable frets because only the peaks 68 of the scallops 66 can be used to locate and receive a fret 70. To accommodate variations in the spacing of the frets, various interchangeable scalloped fret boards are can be provided to take into account the spacing variations found on musical instruments. Therefore the scalloped board as disclosed could be comprised of a single piece with the neck (as shown) or removable, similar to that shown in FIG. 2.

What is claimed is:

1. A musical instrument training device comprising:
    a solid neck extending longitudinally from a first end to a second end; said neck having a substantially flat surface extending longitudinally therealong;
    a channel extending longitudinally through a center of said neck from said first end to said second end;
    a fret board extending longitudinally from a first end to a second end and having at least one transverse groove; the board removably secured to said flat surface;
    at least one fret received within said transverse groove;
    first and second saddles provided on said first and second ends of said neck, respectively; each of said saddles comprising at least one through hole;

string tensioning means provided on said first end of said neck;

at least one string having a first end and second end; said first end secured to said first saddle; said string passing though the through holes of said first and second saddles and entering into said channel at said second end and extending through said channel and being rotatably mounted on said string tensioning means on said first end.

2. The musical training device according to claim 1, wherein said neck having a shape of an elongated half circle.

3. The musical training device according to claim 1, wherein said first and second saddles are mounted to said neck by at least one threaded fastener.

4. The musical training device according to claim 1, wherein said at least one string comprises a plurality of strings having equal gauges.

5. The musical training device according to claim 1 wherein said at least one string comprises a plurality of strings having varied gauges.

6. The musical training device according to claim 4 or 5, wherein the plurality of strings is six.

7. The musical training device according to claim 1, further comprising:

at least one hole provided on the second end of the neck; and, and a handle for engagement with said hole.

8. The musical training device according to claim 1, wherein: said fret board comprises a plurality of scallops; and, said fret received within said groove being positioned at a peak of one of said scallops.

* * * * *